United States Patent [19]

Sugano

[11] Patent Number: 5,000,141
[45] Date of Patent: Mar. 19, 1991

[54] CRANKSHAFT ASSEMBLY
[75] Inventor: Tomohiro Sugano, Fujisawa, Japan
[73] Assignee: Isuzu Motors Limited, Tokyo, Japan
[21] Appl. No.: 396,166
[22] Filed: Jul. 31, 1989
[30] Foreign Application Priority Data Aug. 4, 1988 [JP] Japan .................. 63-193388

[51] Int. Cl.$^5$ .............................. F02B 75/06
[52] U.S. Cl. .................. 123/192 B; 74/603; 29/888.08
[58] Field of Search .......... 123/192 B, 55 VS; 74/603; 29/901, 888.08, 888.1

[56] References Cited

U.S. PATENT DOCUMENTS 4,538,481 9/1985 Ohta et al. .............. 123/192 B

FOREIGN PATENT DOCUMENTS 47-29106 6/1972 Japan ..................... 74/603
701235 12/1953 United Kingdom ........ 74/603
757529 9/1956 United Kingdom ........ 74/603

Primary Examiner—Noah P. Kamen
Attorney, Agent, or Firm—Dykema Gossett

[57] ABSTRACT

A crankshaft assembly used in an internal combustion engine comprises: a crankshaft adjusted in dynamic balance in a manner such that it produces a predetermined inertia couple as it rotates; a pulley provided at one end of the crankshaft; a flywheel provided at the other end of the crankshaft; and balance adjust parts respectively formed in the pulley and flywheel for counterbalancing the inertia couple produced by the crankshaft, so that the crankshaft assembly is balanced statically and dynamically. It is possible to reduce the length of the engine by employing this crankshaft assembly without increasing the width and height of the engine.

12 Claims, 2 Drawing Sheets

CRANKSHAFT ASSEMBLY

BACKGROUND OF THE INVENTION

1. Technical Field

The present invention relates to a crankshaft assembly of an internal combustion engine, and particularly to a crankshaft assembly of a compact V-type engine.

2. Background Art

The crankshaft assembly of an internal combustion engine must possess dynamic balance as well as static balance in order to restrict undesired vibration. More specifically, the sums of inertia forces and inertia couples of the crankshaft assembly have to be adjusted to substantially zero.

Referring to FIG. 3 of the accompanying drawings, a crankshaft 1 of a six-cylinder V-type engine comprises crankpins 2, 3, 4, 5, 6 and 7 spaced apart from each other by predetermined angles in the circumferential direction of the crankshaft 1, crankjournals 8, 9, 10 and 11 respectively supported by bearing members (not shown) of a crankcase (not shown), and crankarms 12, 13, 14, 15, 16, 17, 51, 52 and 53 for connecting the crankpins with the crankjournals. The crankshaft changes the reciprocation of a piston (not shown) to rotation. The crankarms 12-17 and 51-53 are respectively provided with balance weights in a manner such that both total static balance (inertia forces) and dynamic balance (inertia couples) of the crankarms become zero. The crankshaft can rotate smoothly or with less vibration and noise due to the balance weights. The balance adjustment of the crankshaft assembly during assembly generally depends on dummy weights mounted on the crankpins 2-7.

The crankshaft is also provided with a pulley 19 at one end 18 thereof (front end) and a flywheel 21 at the other end 20 thereof (rear end). The pulley 19 drives, for example, a generator and an air conditioner compressor mounted in the engine via a belt. The flywheel helps maintain smooth continuous rotation of the crankshaft and transmits driving power.

In the engine having the crankshaft of FIG. 3, a couple is produced due to an arrangement of the crankpins 2-7 when the crankshaft 1 rotates. Specifically, the resultant force of centrifugal forces (inertia) resulting from reciprocating members, such as pistons, piston rings, and gyrating masses which are considered attached to the crankpins 2-7 becomes zero, as viewed in the axial direction of the crankshaft, as long as the crankpins are equal to each other in weight. In this case, however, a clockwise moment (inertia couple) appears around the center point 0 of the crankshaft. Therefore, the inertia couple should be eliminated when the crankshaft 1 rotates within the speed of ordinary operational range, in order to prevent noise and vibration.

Conventionally, the crankshaft 1 is provided with balance weights 23 at positions opposite the dummy weights 22 so as to balance with the dummy weights, as schematically shown in FIG. 4, in order to eliminate the inertia couple. In such an adjustment, in most cases, the crankarms 12 and 17, which are the furthest crankarms from the center 0, are made thicker (thicker portions serve as the balance weights) rather than attaching real bodies. The crankarms 12 and 17 are chosen since a larger moment is produced in the case where the balance weights are mounted on the furthest crankarms than the case where the weights are the balance weights and are mounted on the crankarms 13 and 16.

Although compact engines are well known in the art, there is a demand for even smaller engines. In designing an engine generally, the balance weights required for the crankshaft are determined by the piston, connecting rods and other fundamental elements of the engine. Therefore, the engine has to be designed larger in height and width in order to reduce the length thereof. In this case, the distance from the center axis 40 to the balance weight becomes large. An engine smaller in height and width (thicker balance weights) can be designed if a longer dimension is allowed in the longitudinal direction of the engine. In other words, something has to be sacrificed, and it is difficult to design an engine more compact than conventional compact engines by adjusting the balance of the crankshaft itself.

Another well-known way of balancing with the dummy weights 22 is schematically illustrated in FIG. 5. In this case, the balance of each element, such as crankshaft 1 and the flywheel 21, is ignored. Importance is placed on the balance of the combination of the crankshaft 1, pulley 19, the flywheel 21, and the dummy weights 22. Therefore, the pulley 19 and the flywheel 21, which have been separately manufactured as balanced members, are provided with imbalances (24) equivalent to the balance weights of the crankshaft such that the combination of the elements is made balanced. In this arrangement, the length of the crankshaft does not elongate, and the weight of the same does not increase. However, the damper pulley 19 and the flywheel 21 are provided with the imbalances prior to assembly. This means that a particular set of the pulley and flywheel is only usable with a corresponding particular crankshaft and engine. Therefore, if there is mismatching, the combined elements cannot function properly in the product. Also, an exchange of he flywheel and damper pulley is generally impossible.

SUMMARY OF THE INVENTION

One object of the present invention is to provide a crankshaft assembly of an engine which is compact, easy to assemble and maintain, and comprises exchangeable elements only.

The above object is attained by a crankshaft assembly comprising: a crankshaft having a dynamic imbalance which causes an inertia couple in a particular direction as it rotates; a pulley provided at one end of the crankshaft; a flywheel provided at the other end of the crankshaft; and balance adjusting parts respectively formed in the flywheel and pulley so as to have an imbalance, which causes a couple in a certain direction, such that they eliminate the inertia couple produced by the crankshaft.

The inertia couple produced due to the rotation of the crankshaft is counterbalanced by another inertia produced due to the rotation of the balance-adjust-part-provided-pulley and flywheel. Therefore, it is not necessary to make the crankarms thicker. In other words, it is possible to manufacture the crankshaft assembly more compactly. Also, unlike the prior art arrangement illustrated in FIG. 5, severe limitations are not imposed in assembling the elements or in exchanging the flywheel and pulley.

DESCRIPTION OF THE PREFERRED EMBODIMENTS

A preferred embodiment of the present invention will now be explained with reference to the accompanying drawings.

Figure 1:
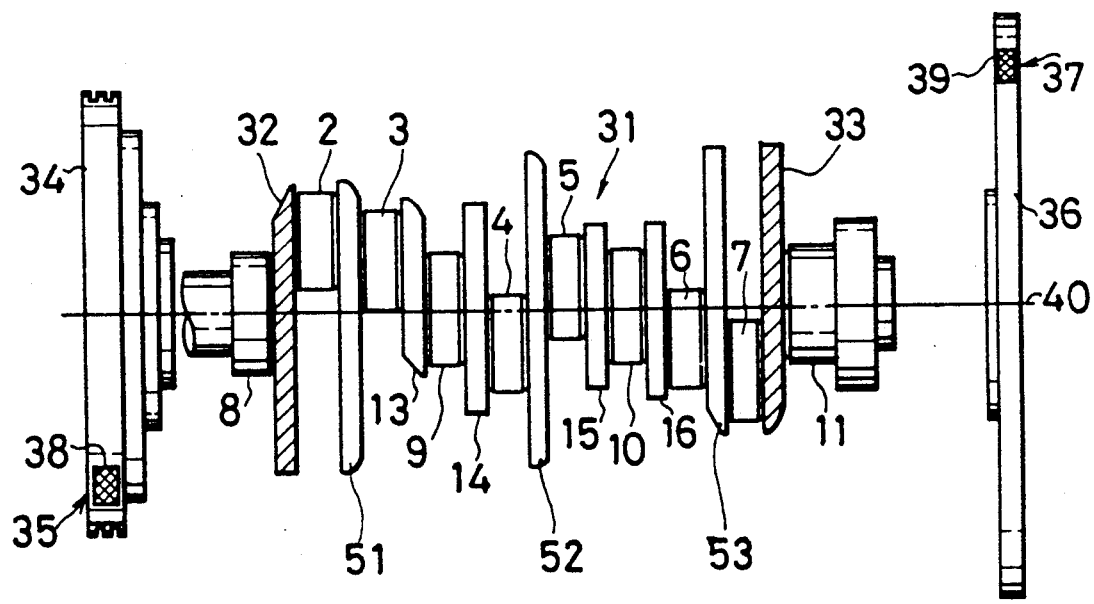
FIG. 1 is a lateral view of a crankshaft assembly of an internal combustion engine according to the present invention.

Referring to FIG. 1, depicted is a crankshaft assembly of an internal combustion engine (a V6 engine in this particular embodiment) according to the present invention.

Figure 4:
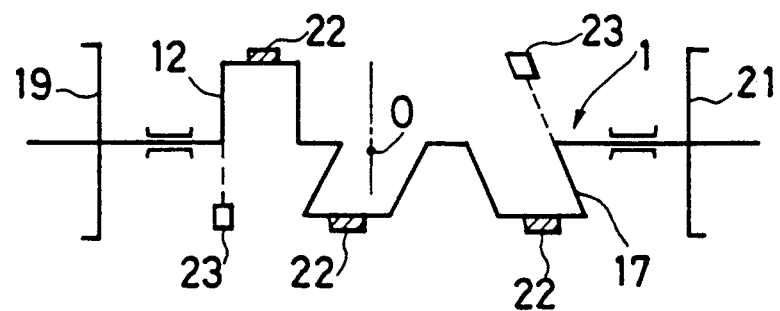
FIG. 4 is a schematic view useful to explain the dynamic balance of the crankshaft assembly of FIG. 3.

The crankshaft 31, like the prior art arrangement, comprises crankpins 2-7, crankjournals 8-11 and crankarms 13-16 and 51-53. However, balance weights are not provided on the crankarms 32 and 33 near the ends of the crankshaft; instead, these crankarms are made equal to other crankarms 13-16 and 51-53 in thickness. In other words, unlike the prior art arrangement illustrated in FIG. 4, the end crankarms 32 and 33 are not provided with balance weights to balance with the dummy weights during assembly.

A balance adjust part 35, which is a significant part of the present invention, is formed within the pulley 34. The balance adjust part 35 is formed apart from the center axis 40 of the pulley 34 and includes a weight 38 having a mass of m1 for counterbalancing the inertia couple produced by the crankshaft 31. Compared with the prior art arrangement, the mass m1 corresponds to the balance weight mounted on the crankarm 32.

Also, another balance adjust part 37 which includes a weight 39 having a mass of m2 is formed in the flywheel 36. This balance adjust part 37 corresponds to another balance weight mounted on the crankarm 33.

The balance adjust parts 35 and 37 are positioned opposite to each other or are positioned with a 180 degree phase difference around the center axis 40 of the crankshaft 31. Also, the balance adjust part 35 is formed at a position opposite the adjacent crankpin 2, and the balance adjust part 37 is formed opposite the adjacent crankpin 7. The pulley 34 and flywheel 36 are coaxial to the crankshaft 31.

Figure 2:
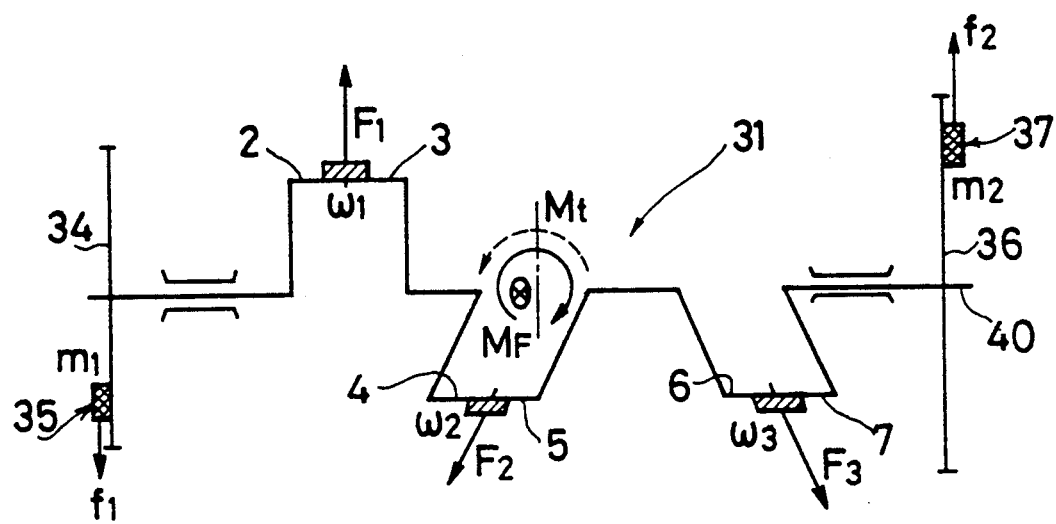
FIG. 2 is a schematic view of FIG. 1 which is useful to explain the dynamic balance of the crankshaft assembly.
Figure 3:
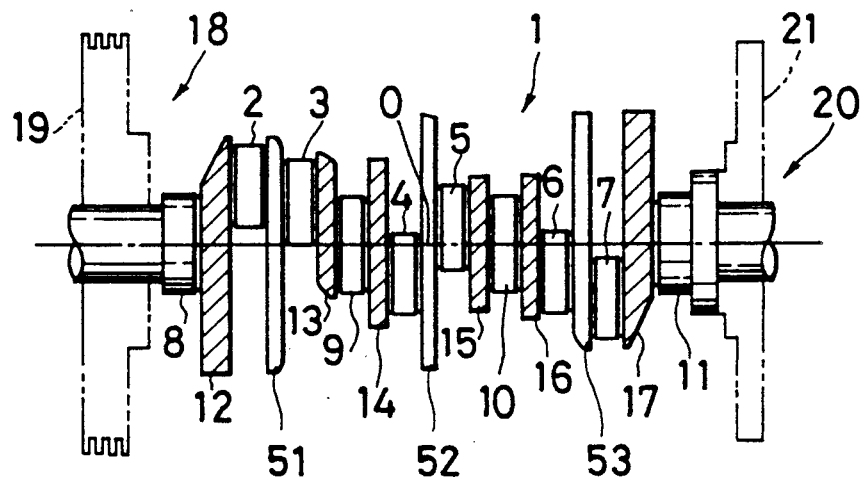
FIG. 3 is a lateral view of a prior art crankshaft assembly of a V6 engine.

Referring now to FIG. 2, as the crankshaft 31 rotates upon movement of a piston (not shown), inertia forces F1, F2 and F3 are respectively produced at the crankpins and consequently an inertia couple $M_F$ is produced around the x axis perpendicular to the crankshaft axis 40 as well as to the drawing. The pulley 34 and flywheel 36 produce forces of inertia f1 and f2 by the imbalances m1 and m2 respectively, thereby producing another inertia couple $M_f$ equivalent to the inertia couple $M_F$ but opposite in direction. Therefore, the inertia couple $M_F$ is counterbalanced, whereby the crankshaft assembly is made balanced as a whole.

In manufacturing the elements of the crankshaft assembly, some elements possess certain imbalance. Specifically, the balance adjust part 35 of the pulley 34 and the balance adjust part 37 of the flywheel 36 are shaped in a manner such that they can produce the inertia forces f1 and f2 respectively. Before adjusting the balance of the crankshaft assembly, for instance, by a balance adjusting machine, the crankshaft 31 is provided with the dummy weights w1, w2 and w3 at the crankpins 2-7. In this manner, accuracy of each element such as the crankshaft 31, damper pulley 34 and flywheel 36, is maintained, and therefore a compact crankshaft assembly can be manufactured.

In actually assembling the crankshaft, pulley and flywheel, respective amounts of the imbalances formed in the elements will be evaluated as satisfactory if the error drops within a predetermined range, for example between 8 and 15 g/cm. Also, when a balance adjusting machine of the type employing a master work is used to form the balance adjust parts, the balance adjust parts 35 and 37 may be easily formed during dynamic balance adjustment of the crankshaft assembly during the calibration by the balance adjusting machine which employs a master work possessing imbalances m1 and m2 beforehand.

Figure 5:
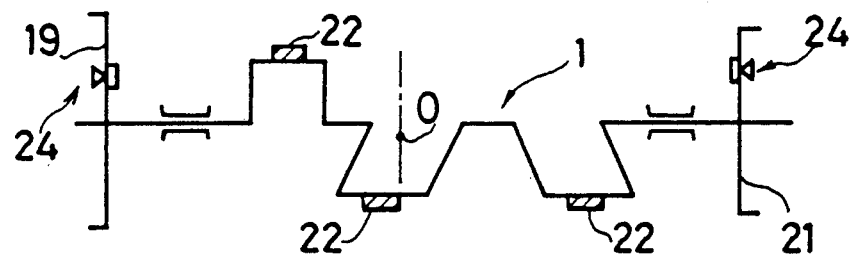
FIG. 5 is a schematic view useful to explain the dynamic balance of another prior art crankshaft assembly.

Therefore, it is possible to reduce the length of the crankshaft 31 since the dynamic balance of the crankshaft 31 is ensured by the pulley 34 and flywheel 36. As a result, a much more compact engine can be manufactured. For instance, when the crankshaft assembly of the present invention is used in a compact engine having a length of 470 mm, the engine length can be reduced by some 19 mm since the crankarms 32 and 33 can be made thinner. Also, since the elements are separately adjusted in balance beforehand, unlike the prior art arrangement illustrated in FIG. 5, no severe limitations are imposed on assembly and exchanging the elements.

Although the above embodiment only deals with a V6 engine, the principle of the present invention can be applied to an engine having an asymmetrical crankshaft, for example, a two-, four-, eight- or ten-cylinder engine.

What is claimed is:

1. A method of manufacturing a crankshaft assembly adapted for use in an internal combustion engine, the crankshaft assembly having a plurality of crankpins, comprising the steps of:

(A) adjusting a crankshaft in dynamic balance in a manner such that the crankshaft produces a non-zero predetermined inertia couple when the engine rotates, the crankshaft having an axis in its longitudinal direction;

(B) adjusting a pulley in dynamic balance in a manner such that the pulley produces a first inertia couple for partially counterbalancing the predetermined inertia couple;

(C) mounting the pulley at one end of the crankshaft;

(D) adjusting a flywheel in dynamic balance in a manner such that the flywheel produces a second inertia couple for counterbalancing a remainder of the predetermined inertia couple; and (E) mounting the flywheel at the other end of the crankshaft.

2. The method of claim 1, wherein said inertia couple is an inertia couple produced around an axis perpendicular to the axis of the crankshaft.

3. The method of claim 1, wherein step (B) includes mounting a first weight on the pulley and step (D) includes mounting a second weight on the flywheel.

4. The method of claim 2, wherein step (B) includes mounting a first weight on the pulley and step (D) includes mounting a second weight on the flywheel.

5. The method of claim 1, wherein step (B) includes forming a first balance adjust part on the pulley at a position spaced apart from the center of the pulley and step (D) includes forming a second balance adjust part on the flywheel at a position spaced apart from the center of the flywheel.

6. The method of claim 2, wherein step (B) includes forming a first balance adjust part on the pulley at a position spaced apart from the center of the pulley and step (D) includes forming a second balance adjust part on the flywheel at a position spaced apart from the center of the flywheel.

7. The method of claim 1, wherein step (B) includes forming a first balance adjust part on the pulley at a predetermined position and step (D) includes forming a second balance adjust part on the flywheel at a position spaced 180 degrees about the axis of the crankshaft.

8. The method of claim 2, wherein step (B) includes forming a first balance adjust part on the pulley at a predetermined position and step (D) includes forming a second balance adjust part on the flywheel at a position spaced 180 degrees about the axis of the crankshaft.

9. The method of claim 1, wherein step (B) includes forming a first balance adjust part on the pulley at a position opposite an adjacent crankpin and step (D) includes forming a second balance adjust part on the flywheel at a position opposite an adjacent crankpin.

10. The method of claim 2, wherein step (B) includes forming a first balance adjust part on the pulley at a position opposite an adjacent crankpin and step (D) includes forming a second balance adjust part on the flywheel at a position opposite an adjacent crankpin.

11. The method of claim 1, wherein step (B) includes forming a first balance adjust part on the pulley as an integral part of the pulley and step (D) includes forming a second balance adjust part on the flywheel as an integral part of the flywheel.

12. The method of claim 2, wherein step (B) includes forming a first balance adjust part on the pulley as an integral part of the pulley and step (D) includes forming a second balance adjust part on the flywheel as an integral part of the flywheel.

* * * * *